No. 721,913. PATENTED MAR. 3, 1903.
I. E. PALMER.
FISH TRAP.
APPLICATION FILED MAR. 16, 1901.
NO MODEL. 2 SHEETS—SHEET 1.

Witnesses:
George Barry Jr
Henry Thieme.

Inventor:
Isaac E. Palmer
by attorneys
Brown & Seward

No. 721,913. PATENTED MAR. 3, 1903.
I. E. PALMER.
FISH TRAP.
APPLICATION FILED MAR. 16, 1901.
NO MODEL. 2 SHEETS—SHEET 2.

Witnesses:
George Barry Jr.
Henry Thieme.

Inventor:
Isaac E. Palmer
by attorneys
Brown & Seward

UNITED STATES PATENT OFFICE.

ISAAC E. PALMER, OF MIDDLETOWN, CONNECTICUT.

FISH-TRAP.

SPECIFICATION forming part of Letters Patent No. 721,913, dated March 3, 1903.

Application filed March 16, 1901. Serial No. 51,418. (No model.)

*To all whom it may concern:*

Be it known that I, ISAAC E. PALMER, a citizen of the United States, and a resident of Middletown, in the county of Middlesex and State of Connecticut, have invented a new and useful Fish-Trap, of which the following is a specification.

My invention relates to a fish-trap, with the object in view of providing a trap that may be folded for convenience in transportation and that may be set up for use with great facility and, further, to provide a trap which may be collapsed while under the water for enabling it to be drawn to the surface with greater facility.

A practical embodiment of my invention is represented in the accompanying drawings, in which—

Figure 1:
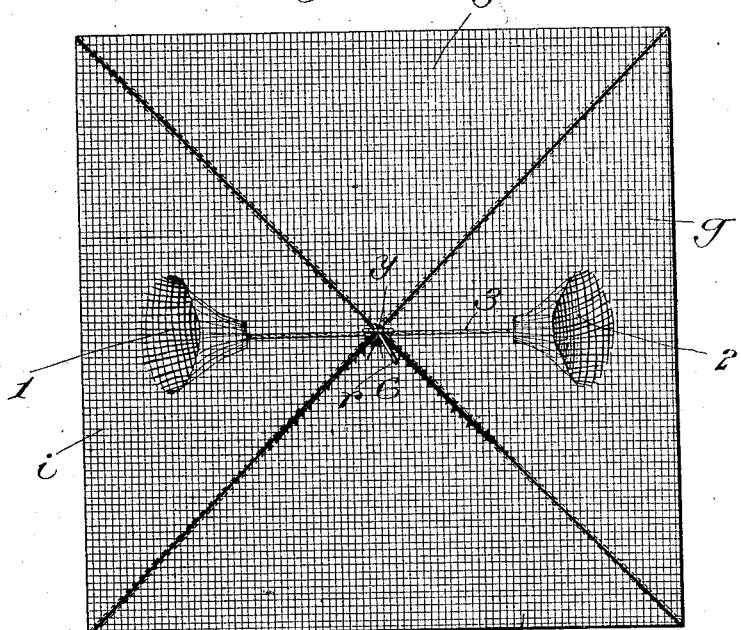
Figure 2:
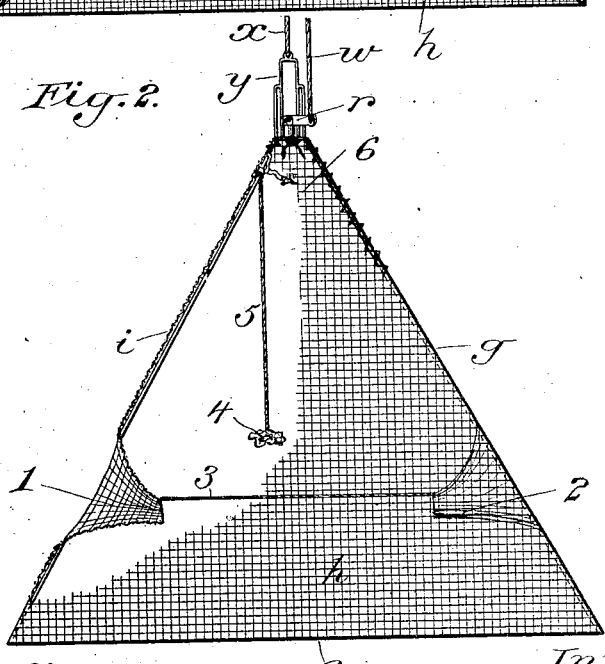
Figure 3:
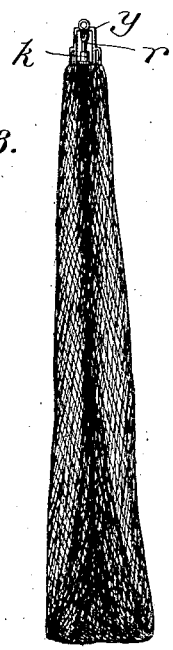
Figure 4:
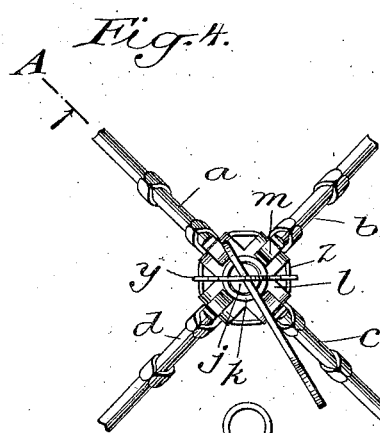
Figure 5:
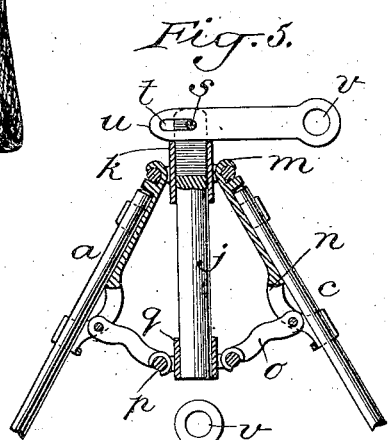
Figure 6:
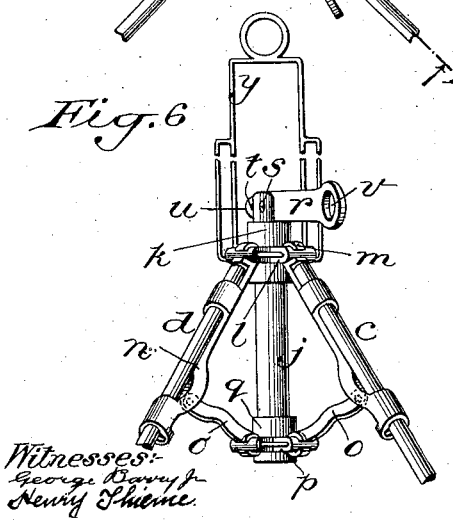
Figure 7:
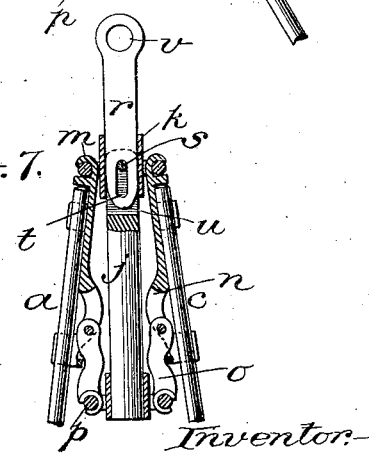

Figure 1 is a top plan view of the trap when distended as in use. Fig. 2 is a view of the same in side elevation, partly in section. Fig. 3 is a view of the same when it is collapsed or folded. Fig. 4 is an enlarged top plan view of the inner or upper ends of the arms, showing their manner of attachment to the center piece or post, the parts being in the position which they assume when the trap is set. Fig. 5 is a view of the same in vertical section in the plane of the line A A of Fig. 4. Fig. 6 is a view of the same in side elevation; and Fig. 7 is a vertical section of the same, showing the parts in their folded adjustment.

The trap-supporting frame consists of several arms, in the present instance four, (denoted by *a b c d*,) diverging from one another a quadrant's distance apart and having secured thereto a net the bottom of which (denoted by *e*) is held distended substantially flat in the plane of the lower ends of the arms *a b c d* and the sides of which (denoted by *f, g, h,* and *i*) are held by the arms in planes extending, respectively, from the four edges of the bottom up to the upper or inner ends of the arms, forming when the trap is distended a hollow pyramid-like structure, with the net forming the bottom and sides and the arms located within the net at the four corners. The several arms are hinged to a central post *j* by means of a sliding sleeve *k*, provided with perforated lugs *l*, extending laterally therefrom and adapted to receive hooks *m* on the ends of socket or hinge pieces *n*, attached to the upper or inner ends of the arms *a b c d*, one for each. Links *o*, which serve also as braces, are pivotally secured at their inner ends to lugs *p*, projecting laterally from a sleeve *q*, fixed on the lower end of the post *j*, and at their outer ends to the hinge or socket pieces *n*. The upper end of the center post *j* is bifurcated, and a trip-lever *r* is pivotally secured between the branches of its bifurcated end by means of a pin *s*, which extends through an elongated slot *t* in the trip-lever to permit the latter to move bodily in the direction of its length to a limited extent relatively to the post *j*. The short end of the trip-lever *r* is rounded, as shown at *u*, to enable it to readily swing into a position in alinement with the center post, and the opposite end is conveniently provided with an eye *v* for the purpose of attaching thereto a trip-line *w*, as shown in Fig. 2.

The trap is raised and lowered and held suspended, if so desired, by means of a line *x*, connected with a vertically-sliding loop *y*, engaged with the suspension-bars *z* intermediate of the lugs *l*, to which the arms are hinged. The suspension-bars *z* are conveniently held by extending a wire through the lugs *l*, the said wire bridging spaces between the lugs to form the suspension-bars.

The trap is provided at one or more of its sides, in the present instance at its two opposite sides, with inwardly-extending funnels 1 and 2, the inner ends of the funnels being left open and held in position when the trap is distended by means of a line 3, extending across the interior of the trap and connecting the inner ends of the two funnels.

Bait for attracting the fish to the interior of the trap through the funnels 1 and 2 is conveniently suspended, as shown at 4, by means of a line 5, attached to one or more of the arms near their upper ends.

In operation the trap having been set, as shown in Figs. 1 and 2, and lowered either to the bottom of the body of water where it is employed or to such a depth as may be desired is allowed to remain for a length of time depending upon the particular object for which it is used. The fish having entered through the funnels 1 and 2, attracted by the bait 4, will be turned away from the inner ends of the funnels by following the line of net around the funnels, as is common in traps of this character, and when it is desired to haul the trap it may either be hauled in its distended position or more conveniently the trip-line $w$ may be used to throw the trip-lever $r$ into the position shown in Fig. 7, permitting the sleeve $k$ to slide upwardly along the center post $j$, causing the arms $a\ b\ c\ d$ to fold toward one another alongside the center post, collapsing the trap into the position shown in Fig. 3. In this collapsed condition the trap may be very easily drawn through the water to the surface, and the fish having been removed through a suitable door—as, for example, the door 6—at the top of the trap the latter may be rebaited, distended, and again set.

It is evident that changes might be resorted to in the form and arrangement of the several parts without departing from the spirit and scope of my invention. Hence I do not wish to limit myself strictly to the structure herein set forth; but

What I claim is—

1. A fish-trap comprising a central support, arms extending downwardly from the central support and hinged to swing toward and away from one another, a net loosely enveloping the arms and forming a substantially inclosed space, the said net being connected to the arms to be distended thereby and provided with one or more funnel-shaped openings through its body for the entrance of fish and means for locking and releasing the arms to hold them in their distended position and to permit them to fold, substantially as set forth.

2. A fish-trap comprising a center post, diverging arms hinged to the center post to swing toward and away from one another, link-braces pivotally secured to the center post and arms, a net enveloping the arms and adapted to be distended thereby, the said net being provided with one or more funnel-shaped openings for the entrance of fish and means for locking and releasing the swinging arms to hold the net distended and permit it to collapse, substantially as set forth.

3. A fish-trap comprising a center post, a sliding sleeve mounted on the center post, arms hinged to the sliding sleeve, brace-links pivoted to the center post and arms, a trip-lever pivoted to the center post in position to lock the sleeve, to hold the arms distended, a net enveloping the arms and adapted to be distended thereby, the said net being provided with one or more funnel-shaped openings for the entrance of fish and means for operating the trip-lever, substantially as set forth.

In testimony that I claim the foregoing as my invention I have signed my name, in presence of two witnesses, this 5th day of March, 1901.

ISAAC E. PALMER.

Witnesses:
CHAS. M. SAUER,
PAUL S. CARRIER.